United States Patent [19]
Ishihara et al.

[11] 3,753,716
[45] Aug. 21, 1973

[54] METHOD FOR ANTISTATIC TREATMENT OF PLASTIC FILMS

[75] Inventors: Masao Ishihara; Koichi Horigome, both of Tokyo; Masaru Kanbe, Yamanashi-ken; Masahide Tamura; Motoo Kogure, both of Tokyo, all of Japan

[73] Assignee: Konishiroki Photo Industry Co., Ltd., Tokyo, Japan

[22] Filed: Feb. 4, 1972

[21] Appl. No.: 223,698

[52] U.S. Cl. ............... 96/87 A, 96/114.2, 117/34, 117/161 UC, 260/DIG. 17
[51] Int. Cl. .............................................. G03c 1/82
[58] Field of Search .................. 96/87 A, 114.2; 260/DIG. 17; 117/161 UC, 34

[56] References Cited
UNITED STATES PATENTS
3,632,543  1/1972  van Paesschen et al............. 96/114
3,676,209  7/1972  Mackey et al................ 117/161 UC
3,540,923  11/1970 Rozek .......................... 117/161 UC
3,645,989  2/1972  Tandy ......................... 117/161 UC Primary Examiner—Ronald H. Smith
Attorney—Jordan B. Bierman et al.

[57] ABSTRACT

A method for antistatic treatment of plastic films, characterized by treating the films with a solution containing a copolymer having the general formula,

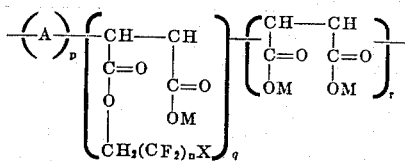

wherein A is a vinyl monomer; M is a hydrogen atom, an alkali metal or a cation of ammonium or the like; X is a hydrogen or fluorine atom; $n$ is an integer of 1 to 8; and $p$, $q$ and $r$ are mole percentages of the copolymer components, where $p$ is 40 to 60, $q+r$ is $100-p$ mole%, and $[q/(q+r)] \times 100$ is 10 to 100.

2 Claims, No Drawings

METHOD FOR ANTISTATIC TREATMENT OF PLASTIC FILMS

As is well known, plastic films is statically charged at the time of friction or peeling of the films. For example, plastic films tend to be charged with static electricity during such handling operations as rolling-up, rolling-back or passage on rolls of the films, or movement of sheets. This static electricity brings about various drawbacks such as attraction of dust, ignition upon electric shock, adhesion of films to each other or to other members and, in the case of photographic films, formation of the so-called static marks due to discharge of the static electricity.

In order to remove or decrease the static charge of plastic films, various processes have heretofore been proposed. For example, there have been known processes in which plastic films are treated on one or both sides with substances capable of increasing the electric conductivity of said sides. As the substances used in said processes, substances containing ionic or highly polar materials such as inorganic salts, sulfonic acid, phosphoric acid, amines, quaternary salts, etc. have been well known. Most of these substances themselves are electroconductive and do not form satisfactory antistatic coating. Further, some of them penetrate excessively into the substrates to become insufficient in antistatic effect or show no persistency of antistatic effect. Moreover, they are excessively hygroscopic and, when brought to a state low in relative humidity, they are deprived of their antistatic effects. Thus, the prior art processes have had various drawbacks.

Furthermore, in the case of light-sensitive photographic materials, antistatic treatment applied thereto should not be that which gives any influence to the photographic properties thereof.

In view of such actual state as mentioned above, we made extensive studies to find an antistatic treatment process which is free from the above-mentioned drawbacks, high in antistatic effect, and does not give any influence to the photographic properties of light-sensitive photographic materials.

That is, the present process uses a copolymer of the aforesaid general formula, and the antistatic effect thereof is displayed by the maleic acid component containing a fluorine-containing alkyl group. The said copolymer used in the present invention preferably has a molecular weight in the range from about 5,000 to 500,000. The use of a copolymer, which is low in molecular weight and has no film-forming ability, gives no favorable result.

The copolymer used in the present invention is soluble in methanol itself or in methanol containing 1 to 10 percent of water. A copolymer, which is effectively usable in the present invention, is preferably such that the specific viscosity thereof in a 1 percent solution at 25°C. is in the range from 0.1 to 0.02.

The vinyl monomer component of the copolymer having the aforesaid general formula includes ethylene, styrene, vinyl acetate, diisobutylene, methylvinylether and butylvinylether, though these are not limitative.

The maleic acid derivative component of the copolymer having the aforesaid general formula is synthesized in such a manner that at the time of copolymerization, radical polymerization is effected in the presence of maleic anhydride, the resulting copolymer is esterified with a fluorinated alcohol of the general formula, $$X(CF_2)_nCH_2OH$$

wherein X is a hydrogen or fluorine atom; and $n$ is an integer of 1 to 8, and then a part or all of the carboxyl group is neutralized to form a salt.

Concrete procedures for synthesis of typical copolymers used in the present invention are explained below with reference to synthesis examples.

SYNTHESIS EXAMPLE 1

Synthesis of styrene-sodium-2,2,3,3-tetrafluoro-n-propylmaleate copolymer

A styrene-maleic anhydride alternating copolymer (polymerization degree 500) synthesized according to radical polymerization was dissolved in 1 liter of dioxane. Into the resulting solution was gradually dropped with stirring at 100°C. 145 g. of 2,2,3,3-tetrafluoro-n-propanol. When the dropping had been complete, the reaction liquid separated into 2 layers, but when the reaction liquid was continuously refluxed with stirring for 5 hours, a completely homogeneous liquid was formed. After continuing the reflux for additional 4 hours, the liquid was allowed to cool to room temperature, and 1 liter of an aqueous 1N-caustic soda solution was gradually dropped into the liquid with stirring. Subsequently, 1,560 ml. of pure water was added to the liquid to obtain a dope usable for antistatic treatment after dilution with methanol to 10 to 40 times.

This dope was subjected to salting-out by addition of 200 ml. of a saturated aqueous sodium iodide solution, and the resulting precipitate was recovered to obtain 310 g. of a copolymer having a specific viscosity of 0.6 as measured in 1 percent methanol solution at 25°C.

SYNTHESIS EXAMPLE 2

Synthesis of styrene-sodium 2,2,3,3,4,4,5,5,6,6,7,7,8,8,9,9-hexadecafluoro-n-nonyl maleate copolymer 202 Grams of SMA Resin (trade name of a resin produced by Nippon Shokubai Kagaku Kogyo K.K.), which is a commercially available low molecular weight styrene-maleic anhydride alternating copolymer, was dissolved in 1 liter of dioxane. To the resulting solution was gradually added with stirring at 100°C. 432 g. of 2,2,3,3,4,4,5,5,6,6,7,7,8,8,9,9-hexadecafluoro-n-nonanol. After reacting the resulting mixture with stirring at 100°C. for 20 hours, the reaction liquid was allowed to cool to room temperature, and 1 liter of an aqueous 1N-caustic soda solution was gradually added to the liquid with stirring. This liquid was subjected to salting-out by addition of 200 ml. of a saturated aqueous sodium chloride solution, and the resulting precipitate was recovered, dipped in acetone, washed and then dried to obtain 590 g. of a copolymer having a specific viscosity of 0.2 as measured in 1 percent methanol solution at 25°C.

SYNTHESIS EXAMPLE 3

Synthesis of methylvinylether-sodium 2,2,3,3,4,4,5,5-octafluoro-n-pentyl maleate copolymer 156 Grams of Gantrez AN-119 [trade name of a resin produced by General Anilin Film (GAF) Co.], which is a commercially available methylvinylether-maleic anhydride copolymer, was dissolved in 1 liter of dioxane. Into the resulting solution was gradually dropped with stirring at 100°C. 255 g. of 2,2,3,3,4,4,5,5-octafluoro-n-pentanol. After reacting the resulting mixture with stirring at 100°C. for 12 hours, the reaction liquid was allowed to cool to room temperature, and 1 liter of an aqueous 1N-caustic soda solution was gradually added to the liquid with stirring. Subsequently, 1,900 ml. of pure water was added to obtain a dope usable for antistatic treatment after dilution with methanol to 10 to 40 times. This dope was subjected to salting-out by addition of 200 ml. of a saturated aqueous solution iodide solution to obtain 395 g. of a copolymer having a specific viscosity of 0.8 as measured in 1 percent methanol solution at 25°C.

SYNTHESIS EXAMPLE 4

Synthesis Example 1 was repeated, except that 2,2,3-,3,3-pentafluoro-n-propanol was used in place of the 2,2,3,3-tetrafluoro-n-propanol, to obtain a styrene-sodium 2,2,3,3,3-pentafluoro-n-propyl maleate copolymer.

According to the present invention, it is sufficient that such copolymer as mentioned above is dissolved to a concentration of about 0.2 to 2 percent in methanol itself or in methanol containing a small amount (1 to 10 percent) of water, and the resulting solution is coated on a film by dip coating, air-knife coating, curtain coating, spray coating or the like known coating procedure.

The present invention is not only applicable to the known plastic films but also effectively applicable to such photographic films as mentioned below.

1. A plastic film (cellulose triacetate film or polyethylene terephthalate film) having a gelatin layer adhered on one or both sides of the film.
2. A photographic film having a photographic emulsion layer and a protective layer on the above-mentioned gelatin layer.

The antistatic layer according to the present process may contain an inorganic salt such as aluminum nitrate or lithium chloride, or an auxiliary antistatic agent of the general formula,

wherein $R_1$ and $R_2$ are individually an alkyl group having 18 or less carbon atoms, and a so-called matting agent for improving the surface smoothness of film, e.g., silica or polymethyl methacrylate.

The present invention is illustrated in further detail below with reference to examples.

EXAMPLE 1

A cellulose triacetate film was coated with a solution of the following composition:

| | |
|---|---|
| Copolymer of Synthesis Example 1 | 0.4 g. |
| Finely divided silica (particle size 1 to 10 μ) | 0.02 g. |
| Water | 5 ml. |
| Methanol | 95 ml. |

Subsequently, the film was dried at 90°C. for 2 minutes.

The surface specific resistivity of the film subjected to the above-mentioned treatment was $4.5 \times 10^9$ Ω at 25°C. and 50% RH, whereas that of the untreated film was more than $10^{14}$ Ω.

The thus treated film was markedly small in amount of static electricity generated and accumulated due to peeling at the time of winding and rewinding during the production step and due to friction with rubber rolls at the time of transfer, and had no drawbacks at all in practice.

EXAMPLE 2

A polyethylene terephthalate roentgen film having gelatin layers adhered on both sides of the film, which had been oriented in biaxial directions, was coated with a solution formed by diluting the dope prepared in Synthesis Example 1 with methanol to 25 times, and then dried at 90°C. for 3 minutes.

The surface specific resistivity of the film subjected to the above treatment was $2.9 \times 10^9$ Ω at 25°C. and 50% RH. This film was extremely small in amount of static electricity generated and accumulated due to friction with rubber rolls used at the time when an emulsion layer had been applied onto the opposite side, and did not form the so-called static marks at all.

EXAMPLE 3

A polyethylene terephthalate roentgen film having adhesive layers, silver halide emulsion layers and gelatin protective layers on both sides of the film, which had been oriented in biaxial directions, was coated on the upper-most layer with a solution of the following composition:

| | |
|---|---|
| Copolymer of Synthesis Example 2 | 0.8 g. |
| Finely divided silica (particle size 1 to 20 μ) | 0.02 g. |
| Water | 10 ml. |
| Methanol | 90 ml. |

Subsequently, the film was dried at 40°C. for 3 minutes.

The surface specific resistivity of the film subjected to the above-mentioned treatment was $8.2 \times 10^8$ Ω at 25°C. and 50% RH, whereas that of the untreated film was more than $10^{15}$ Ω.

The thus treated film was markedly small in amount of static electricity generated and accumulated due to various frictions and peelings at the time of handling, and could be prevented from formation of the so-called static marks. Further, the film displayed a desirable smoothness and an adhesion-preventing effect, in addition to the antistatic effect.

What we claim is:

1. A method for antistatic treatment of a plastic film, characterized in that one or both sides of the film is treated with a solution containing a copolymer having the general formula,

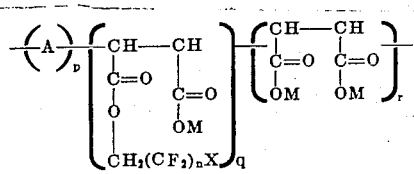

wherein A is a vinyl monomer; M is a hydrogen, alkali metal or ammonium cation; X is hydrogen or fluorine; n is an integer of 1 to 8; and p, q and r are mole percentages of the copolymer components, where p is 40 to 60, q+r is 100−p, and [q/(q+r)] × 100 is 10 to 100.

2. A method for antistatic treatment of a plastic film as claimed in claim 1, wherein said plastic film is a light-sensitive silver halide photographic film comprising a plastic support and coated thereon a photographic layer.

* * * * *